United States Patent [19]

Lee

[11] Patent Number: 6,094,690
[45] Date of Patent: Jul. 25, 2000

[54] COMPUTER SYSTEM WITH DYNAMIC ENABLING AND DISABLING FUNCTION OF THE INTERNAL VGA MODULE

[75] Inventor: Hyun-Kook Lee, Kyunggi-do, Rep. of Korea

[73] Assignee: SamSung Electronics Co., Ltd., Kyungki-do, Rep. of Korea

[21] Appl. No.: 08/969,615

[22] Filed: Nov. 13, 1997

[51] Int. Cl.[7] .................................................. G06F 3/00
[52] U.S. Cl. ............................. 710/10; 710/8; 710/46; 710/102; 711/101; 713/1; 713/2; 713/100
[58] Field of Search ................... 710/49, 36, 8, 710/102, 46, 10; 714/14; 711/101; 713/1, 2, 100

[56] References Cited

U.S. PATENT DOCUMENTS

| | | | |
|---|---|---|---|
| 5,072,411 | 12/1991 | Yamaki | 395/520 |
| 5,140,693 | 8/1992 | Ninomiya | 710/102 |
| 5,159,683 | 10/1992 | Lvovsky et al. | 395/500 |
| 5,187,352 | 2/1993 | Blair et al. | 235/382 |
| 5,237,690 | 8/1993 | Bealkowski et al. | 710/10 X |
| 5,374,940 | 12/1994 | Corio | 345/1 |
| 5,473,775 | 12/1995 | Sakai et al. | 713/2 |
| 5,479,182 | 12/1995 | Sydor | 343/895 |
| 5,594,874 | 1/1997 | Narayanan et al. | 710/8 |
| 5,692,219 | 11/1997 | Chan et al. | 710/49 |
| 5,799,204 | 8/1998 | Pesto, Jr. | 710/14 |
| 5,809,330 | 9/1998 | Ninomiya | 710/9 |

OTHER PUBLICATIONS

"Upgrading and Repairing PCs", pp. 30–31, 2nd Edition, Mueller, 1992.

*Primary Examiner*—Thomas C. Lee
*Assistant Examiner*—Tammara Peyton
*Attorney, Agent, or Firm*—Robert E. Bushnell, Esq.

[57] ABSTRACT

A computer system having a control system for controlling a VGA module built in the motherboard is disclosed. The operation of the internal video module is dependent on the existence of an add-on video card mounted in an expansion slot of the computer system. The control system for enabling and disabling the internal video adapter module includes an IDSEL (device identification signal line) signal masking and unmasking circuit provided at the IDSEL signal line placed between the internal video adapter module and a system bus, wherein the masking and unmasking of the IDSEL signal are responsive to a control signal fed from the computer system; and a system BIOS outputting the control signal supplied with the IDSEL signal masking and unmasking circuit through a general purpose input/output module, wherein the output of the control signal is dependent on the existence of an add-on video card mounted in an expansion slot. Initially, the IDSEL signal is set to the unmasked or active state, thereby notifying the computer system of the presence of the internal video adapter module. If the add-on video card is detected, a logic low or OFF signal $S_c$ is outputted to the general purpose input/output module to mask the IDSEL signal applied with the internal video module. With this, the internal video adapter module is automatically disabled. Then the system BIOS performs the initialization routine of the add-on video card.

12 Claims, 4 Drawing Sheets

COMPUTER SYSTEM WITH DYNAMIC ENABLING AND DISABLING FUNCTION OF THE INTERNAL VGA MODULE

CLAIM OF PRIORITY

This application makes reference to, incorporates the same herein, and claims all benefits accruing under 35 U.S.C §119 from an application entitled Computer System With Dynamic Enabling/Disabling Qf The Internal VGA Module earlier filed in the Korean Industrial Property Office on Nov. 13, 1996, and there duly assigned Ser. No. 96-53777 by that Office.

BACKGROUND OF THE INVENTION

1. Field of the Invention

The present invention relates to a computer system, and more particularly to a controlling system for a VGA module built in the motherboard where an add-on video card can be received in an expansion slot.

2. Background Art

The video card or video adapter provided with personal computers functions as a hardware interface with a display device. An exemplary computer system comprises a central processing unit (CPU), a BIOS, a main memory, an interface controller with an auxiliary storage, and a video adapter, which are linked to a system bus. The video adapter deals with image data and outputs the video signal to a display device such as cathode ray tube (CRT) or liquid crystal display (LCD). Sometimes, the video adapter is incorporated into a motherboard by PC manufacturers to lower the overall cost as well as to improve reliability of the computer system. Also, added are expansion slots to enable new features and enhancements to be added to the system as well as allowing the quick and easy alteration of certain computer prerequisites, such as video adapters. When an add-on video card is used in such a motherboard design, the built in or internal video adapter module should be disabled. Disabling of the internal video module is performed by a jumper setting method which connects or disconnects a device identification signal line provided between the video adapter and the system bus such as a PCI bus. Initially, the jumper is set to the connected state to notify the computer system of presence of the internal module, thereby enabling the internal video module. If an add-on video card is used, the jumper is set to the disconnected state manually before or after the add-on video card is inserted in one of the expansion slots. This disables the internal adapter module and enables the add-on video card after an initialization procedure. The manual jumper setting process for enabling or disabling the built in video module is troublesome and this design is not in agreement with the plug and play requirements of some operating systems and corresponding hardware design guide.

U.S. Pat. No. 5,374,940 to Mark A. Corio entitled System For Operating A Plurality Of Graphics Displays From A Single Computer contemplates utilizing a plurality of video graphic cards connected to respective ISA expansion slots of a computer's motherboard wherein each video graphic card is addressable and provides data for display to a respective display monitor. The foregoing patent, however, does not contemplate usage within a PC where there is a video adaptor forming an integral part of the motherboard.

SUMMARY OF THE INVENTION

It is therefore an object of the invention to provide a computer system having a dynamic enable and disable function of the internal video adapter module depending on the existence of an add-on video card.

The present invention resides in a computer system having a video adapter module built in the motherboard and an expansion slot for receiving an add-on video card, an apparatus for enabling and disabling the internal video adapter module comprises an identification signal masking and unmasking means provided at the device identification signal line (IDSEL) placed between the internal video adapter module and a system bus, wherein the masking and unmasking of the IDSEL signal are responsive to a control signal fed from the computer system; and a system BIOS outputting the control signal supplied to the identification signal masking and unmasking means through a general purpose input/output (GPIO) module, wherein the output of the control signal is dependent on the presence of an add-on video card mounted in an expansion slot.

In the controlling system, the system bus includes PCI bus. Further, the device identification signal is initially set to the unmasked or active state, thereby notifying the computer system of the presence of the internal video adapter module.

In accordance with another aspect of this invention, the method for enabling and disabling the internal video adapter module comprises the steps of determining whether an add-on video card is mounted in the expansion slot during a power-on-self-test (POST) operation; outputting a logic low signal to the GPIO module to mask the device identification signal applied with the internal video adapter module if the add-on video card is detected; and performing the initialization routine of the add-on video card and returning to the system BIOS routine.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
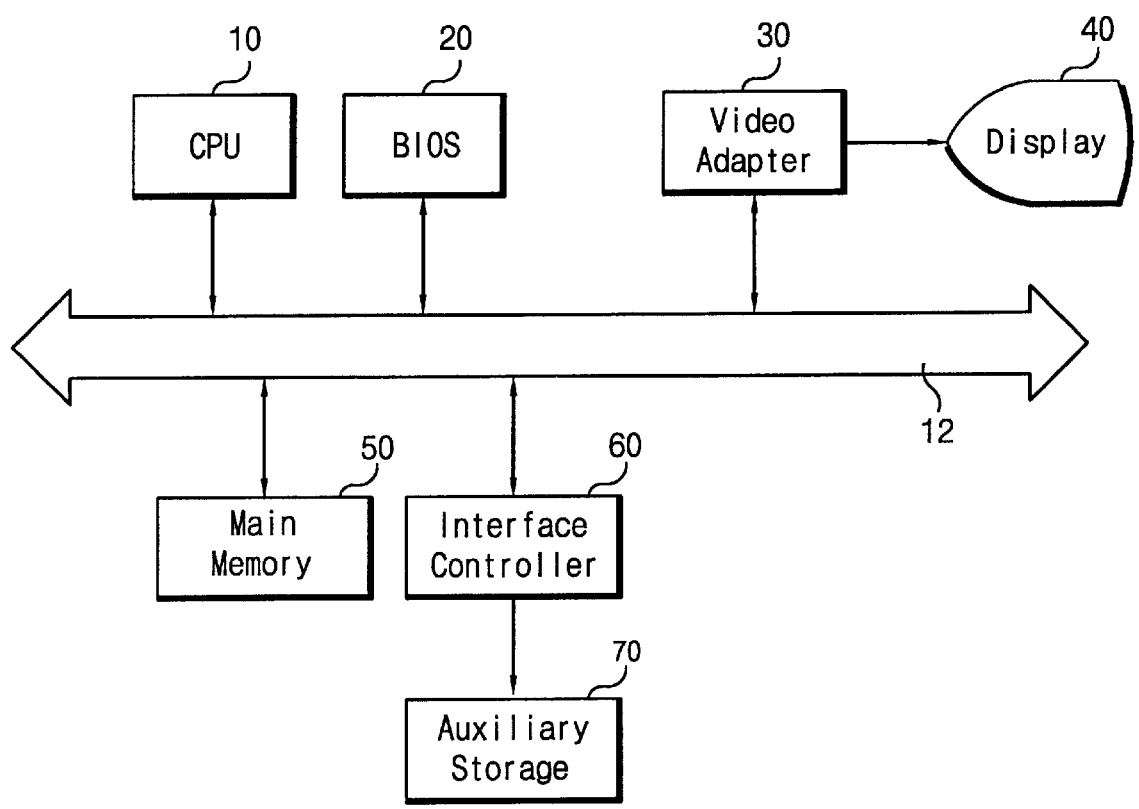
FIG. 1 is a diagram depicting a conventional computer system having a VGA card.

A typical computer system is shown in FIG. 1 for the purpose of explanation. The computer system comprises a CPU 10, a BIOS 20, a main memory 50, an interface controller 60 with an auxiliary storage 70, and a video adapter 30, which are linked to a system bus 12. The video adapter 30 deals with image data and outputs the video signal to a display device 40 such as CRT and LCD. The video adapter 30 is incorporated into the motherboard (not shown) to lower the overall cost as well as to improve reliability of the computer system.

Figure 2:
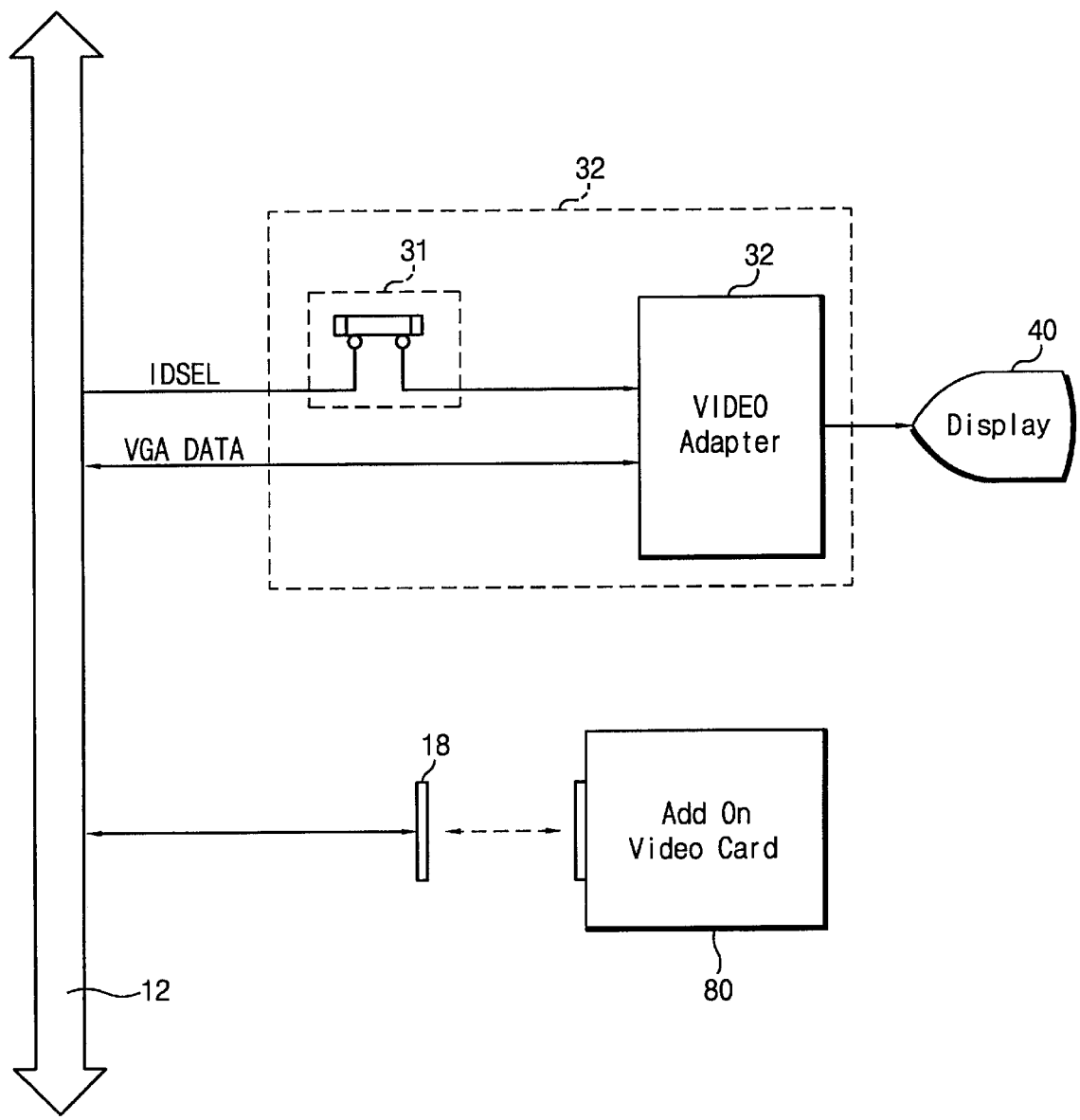
FIG. 2 is a block diagram of a controlling system for a VGA module built in the motherboard in relation to an add-on video card in accordance with a conventional computer system.

Conventionally, when adding another video card, disabling of the internal video module is performed by a jumper setting method as shown in FIG. 2. There, the internal video adapter module 30A has a jumper 31 which connects or disconnects the device identification signal line IDSEL provided between video adapter 32 and a bus 12 such as PCI bus. Initially, jumper 31 is set to the connected state to notify the computer system of presence of internal module 30A, thereby enabling the internal video module. If an add-on video card 80 should be used, jumper 31 is set to the disconnected state manually before or after add-on video card 80 is inserted in an expansion slot 18. This allows internal adapter module 30A to be disabled and add-on video card 80 to be enabled through an initialization procedure.

Figure 3:
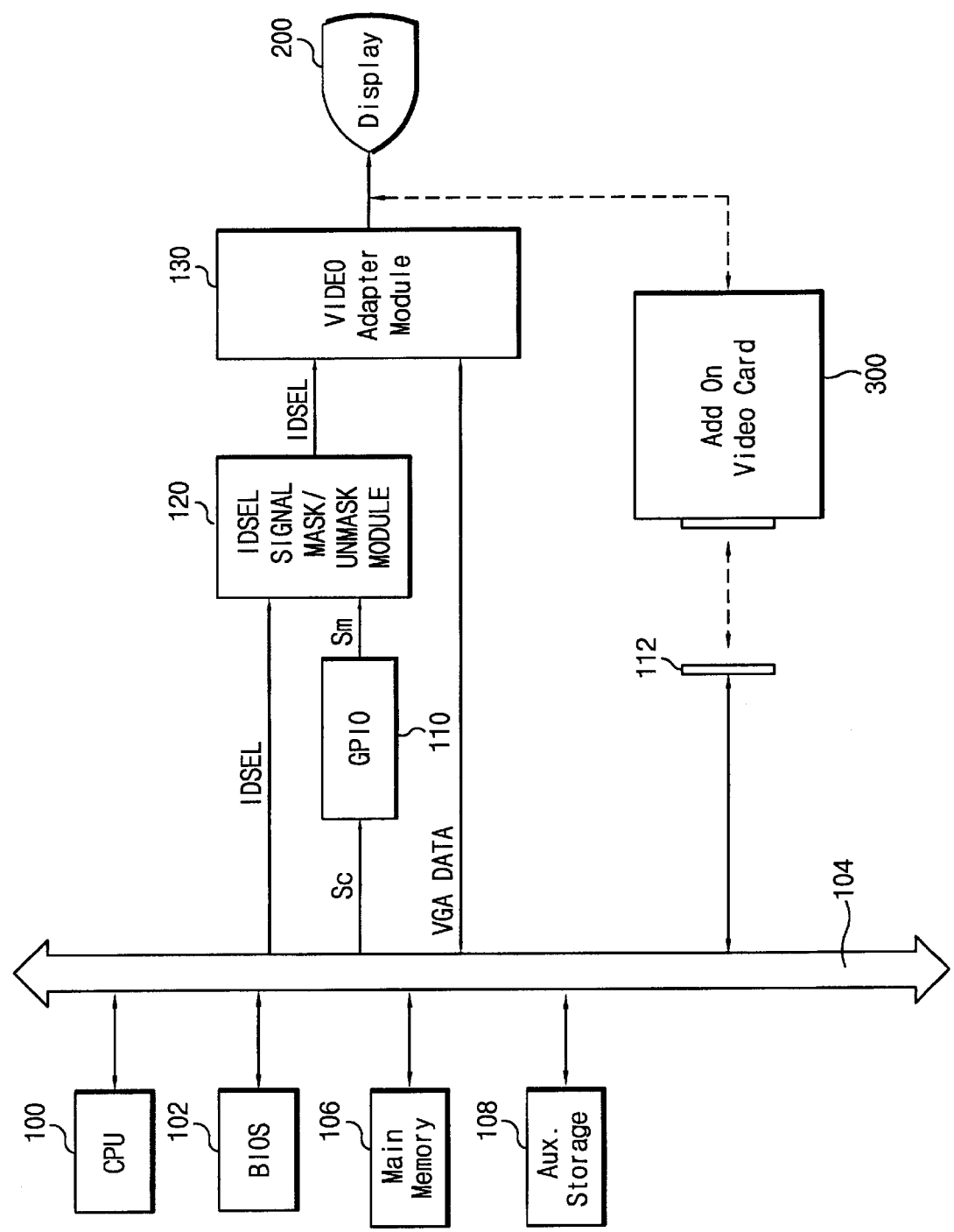
FIG. 3 is a block diagram depicting a control system for the internal video adapter module in accordance with the principles of the present invention.

Referring to FIG. 3, there is shown a control system for the internal video module in accordance with the invention. The control system includes a device identification signal control module 120 provided at the device identification signal line IDSEL placed between a video adapter module 130 built in the motherboard (not shown) and a system bus 104 such as a PCI bus. Also, internal video adapter module 130 has address and control lines for the VGA data, connected to the bus 104. Through bus 104, a CPU 100, a system BIOS 102, a main memory 106, an auxiliary storage 108 storing an operating system (OS), and an expansion slot 112 are linked together to form a computer system. A display device 200 such as a CRT or LCD is provided to be supplied with the video signal produced in internal video module 130 or an add-on video card 300 coupled to expansion slot 112.

Further, the computer system has a general purpose input/output (GPIO) module 110 which receives a control signal $S_c$ via the system bus 104 and outputs a masking signal $S_m$ supplied to identification signal control module 120 so as to mask and unmask the IDSEL signal applied to internal video adapter module 130. Initially, the IDSEL signal is set to the unmasked or active state, notifying the computer system of the presence of internal video adapter module 130. Thereby, the computer system enables internal video module 130. If an add-on video card 300 is inserted into expansion slot 112, the computer system recognizes the add-on video card by checking each expansion slot 112 during booting and checking the device ID and the presence of the option ROM (not shown) of add-on video card 300. Then, BIOS 102 produces a control signal $S_c$ having logic high or low level. This logic high or low signal allows the GPIO module 110 to generate masking signal $S_m$ for the IDSEL signal. Upon receiving masking signal $S_m$ identification signal control module 120 deactivates the IDSEL signal. This disables the internal video adapter module 130 and enables the add-on video card 300.

Figure 4:
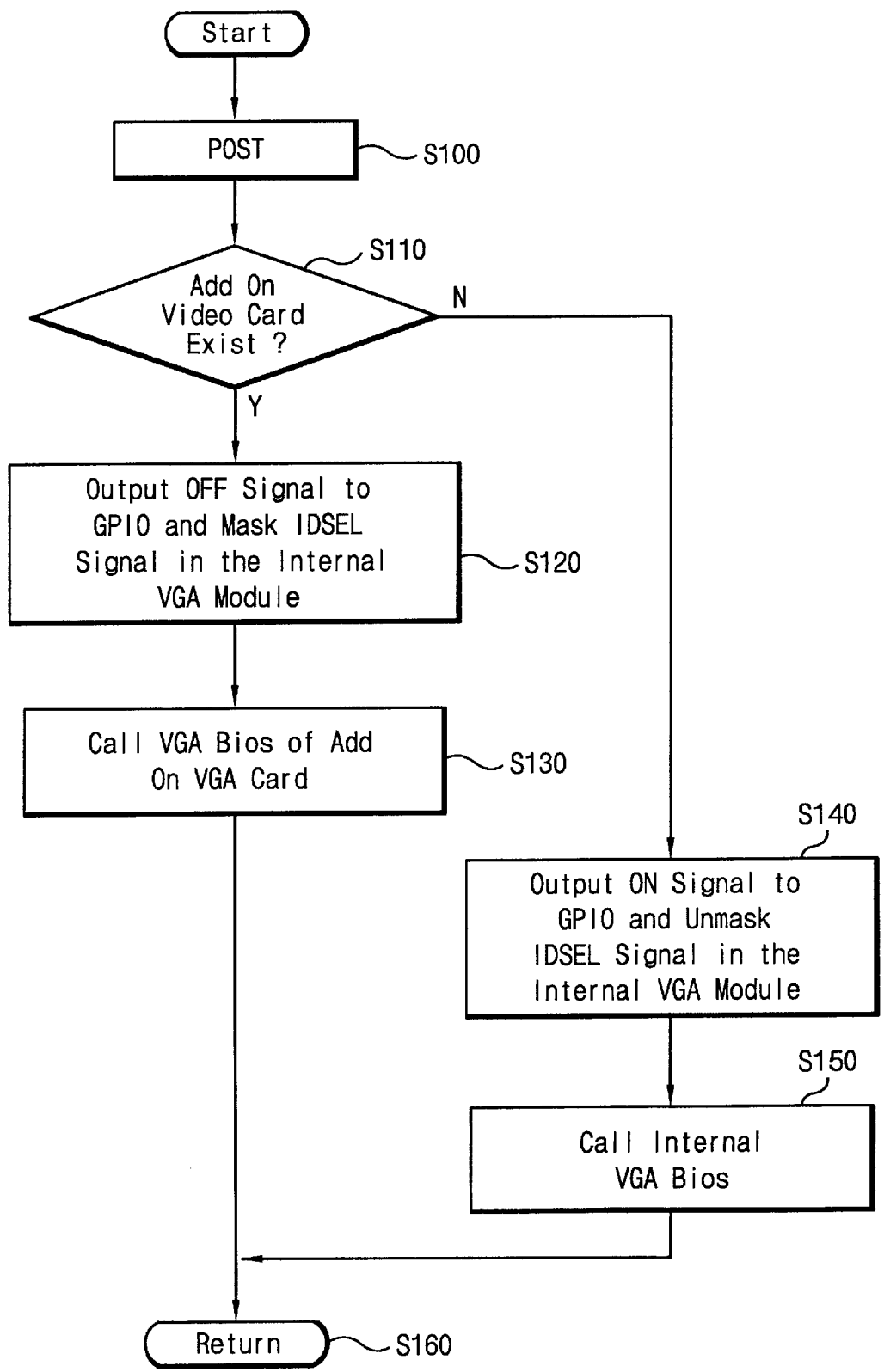
FIG. 4 is a flow chart of a controlling method adopted in the control system shown in FIG. 3 in accordance with the principles of the present invention.

The detailed operation of the control system will be described with reference to the flow chart of FIG. 4. When the computer system is started, BIOS 102 performs a power-on-self-test (POST) at step 100. During the POST operation, a determination, at step 110, is made whether an add-on video card 300 is mounted in an expansion slot 112. If the add-on video card 300 is detected, a logic low or OFF signal $S_c$ is output to GPIO 110 to mask the IDSEL signal which was to be applied to internal video adapter module 130, step 120. Step 120 results in internal video adapter module 130 being disabled. Then BIOS 102 performs the bios routine of add-on video card 300 to initialize video card 300 at step 130, and returns to the system bios routine at step 160.

Meanwhile, if add-on video card 300 is not found at step 110, a logic high or ON signal $S_c$ is output to GPIO 110 to unmask the IDSEL signal applied to the internal video adapter module 130, step 140. Accordingly, the IDSEL signal remains activated and internal video adapter module 130 is enabled. Subsequently, BIOS 102 performs an initialization routine of internal video module 130 at step 150, and returns to the system BIOS routine at step 160.

As apparent from foregoing, the control apparatus of the present invention provides for a convenient usage of the add-on video card adopted in the computer system having a video adapter module built in the motherboard. Once the add-on video card is plugged in the system, the internal video module is automatically disabled and the add-on video card is activated through the booting process. The controlling scheme also meets with the requirement of the hardware design of a common well known operating system.

While the invention has been described in terms of an exemplary embodiment, it is contemplated that it may be practiced as outlined above with modifications within the spirit and scope of the appended claims.

What is claimed is:

1. In a computer system comprising:

a system BIOS for detecting a hardware configuration of said computer system;

an internal video adapter module built in a motherboard;

an expansion slot for receiving an add-on video card; and a control system for enabling and disabling said internal video adapter module;

said control system comprising:

masking means for enabling said internal video adaptor module upon detection of said internal video adapter module by said system BIOS; and means responsive to a control signal generated by said system BIOS upon detection by said system BIOS of an add-on video card inserted in said expansion slot for generating a masking signal, said masking signal being provided to said masking means for masking a device identification signal to disable said internal video adapter module.

2. The computer system as set forth in claim 1, wherein said system bus includes a PCI bus.

3. The computer system as set forth in claim 1, wherein said masking means is initially set to an unmasked state to enable said system BIOS to detect said internal video adapter module.

4. The computer system as set forth in claim 1, wherein said means responsive to said control signal for generating said masking signal comprises a general purpose input/output module.

5. The computer system as set forth in claim 1, wherein said system BIOS identifies said add-on video card and performs a corresponding bios routine for initializing said add-on video card.

6. A method for enabling and disabling an internal video adapter module built in a motherboard of a computer system having an expansion slot for receiving an add-on video card and a system BIOS for detecting hardware configuration of said computer system during a power-on-self-test operation, said method comprising the steps of:

determining by said system BIOS whether an add-on video card is mounted in said expansion slot during said power-on-self-test operation;

outputting from said system BIOS an off signal to a general purpose input/output module when it is determined that said add-on video card is mounted in said expansion slot;

generating, by said general purpose input/output module, a masking signal in response to said off signal;

masking a device identification signal normally applied to said internal video adapter module, in response to said masking signal; and performing an initialization bios routine of said add-on video card and returning to a system bios routine.

7. The method as set forth in claim 6, further comprising the steps of:

outputting from said system BIOS an on signal to said general purpose input/output module when it is determined that said add-on video card is not mounted in said expansion slot to prevent said masking signal from being generated;

enabling device identification signal to be normally applied to said internal video adapter module for enabling said internal video adapter module; and performing a bios routine corresponding to said internal video adapter module.

8. The method as set forth in claim 6, further comprising the steps of:

outputting from said system BIOS an on signal to said general purpose input/output module when it is determined that said add-on video card is not mounted in said expansion slot to prevent said masking signal from being generated;

enabling device identification signal to be normally applied to said internal video adapter module for enabling said system BIOS to identify said internal video adapter module; and performing a bios routine corresponding to said internal video adapter module.

9. A computer system comprising:

a system BIOS for detecting a hardware configuration of said computer system;

an internal video adapter module built in a motherboard;

an expansion slot for receiving an add-on video card; and a control system for enabling and disabling said internal video adapter module;

said control system comprising:

a device identification signal masking/unmasking module for enabling said internal video adaptor module upon detection of said internal video adapter module by said system BIOS; and a general purpose input/output module responsive to a control signal generated by said system BIOS upon detection by said system BIOS of an add-on video card inserted in said expansion slot for generating a masking signal, said masking signal being provided to said device identification signal masking/unmasking module for masking a device identification signal to disable said internal video adapter module.

10. The computer system as set forth in claim 9, wherein said system bus includes a PCI bus.

11. The computer system as set forth in claim 9, wherein said device identification signal masking/unmasking module is initially set to an unmasked state to enable said system BIOS to detect said internal video adapter module.

12. The computer system as set forth in claim 9, wherein said system BIOS identifies said add-on video card and performs a corresponding bios routine for initializing said add-on video card.

* * * * *